(12) United States Patent
Hamel (10) Patent No.: US 8,773,426 B1
(45) Date of Patent: Jul. 8, 2014

(54) REMOVING HIDDEN FACES IN 3D BUILDING MODELS

(75) Inventor: Peter Hamel, Boulder, CO (US)

(73) Assignee: Google Inc., Mountain View, CA (US)

( * ) Notice: Subject to any disclaimer, the term of this patent is extended or adjusted under 35 U.S.C. 154(b) by 890 days.

(21) Appl. No.: 12/909,479

(22) Filed: Oct. 21, 2010

(51) Int. Cl.
*G06T 15/00* (2011.01)

(52) U.S. Cl.
USPC .......................................... 345/419; 345/420

(58) Field of Classification Search
CPC ......... G06T 19/20; G06T 17/10; G06T 17/20; G06T 17/00; G06T 19/00
See application file for complete search history.

(56) References Cited

U.S. PATENT DOCUMENTS 6,335,732 B1 * 1/2002 Shaikh ........................... 345/421

OTHER PUBLICATIONS

Tao Ju, "Robest Repair of Polygonal Models", Aug. 2004, ACM, ACM Transactions on Graphics (TOG)—Proceedings of SIGGRAPH 2004, vol. 23, Issue 3, pp. 888-895.*
David H. Laidlaw, W. Benjamin Trumbore, John F. Hughes, "Constructive Solid Geometry for Polyhedral Objects", Aug. 22, 1986, ACM, ACM SIGGRAPH Computer Graphics, vol. 20, Issue 4, pp. 161-170.*
Stephan Bischoff, Leif Kobbelt, "Structure Preserving CAD Model Repair", Sep. 2005, The Eurographics Association, Computer Graphics Forum, vol. 24, Issue 3, pp. 527-536.*
J. Benner, A. Geiger, K. Leinemann, "Flexible Generation of Semantic 3D Building Models", 2005, Proceedings of the 1st International Workshop on Next Generation 3D City Models, pp. 17-22.*
Ranta-Eskola, S., "Hidden Surface Removal", Sep. 16, 2003, accessed at http://www.devmaster.net/articles/hidden-surface-removal, accessed on Mar. 21, 2011; 10 pages.

* cited by examiner

*Primary Examiner* — Ulka Chauhan
*Assistant Examiner* — Robert Bader
(74) *Attorney, Agent, or Firm* — Dority & Manning, P.A.

(57) ABSTRACT

Systems and methods for removing hidden faces in a 3D model, such as a building model are provided. A method for removing hidden faces in a 3D building model may include identifying a 3D building model having hidden surfaces inside the building model. The method may further include adding closing surfaces to the hidden surfaces to form closed hidden surfaces. The method may further include combining the closed hidden surfaces into a single polygon. The method may then include removing the closed hidden surfaces. A system for removing hidden faces in a 3D building model may include a surface identifier, a surface adder, a surface combiner and a surface remover. The removal of unnecessary internal surfaces and artifacts may increase the efficiency of the 3D building model.

20 Claims, 8 Drawing Sheets

REMOVING HIDDEN FACES IN 3D BUILDING MODELS

BACKGROUND

1. Technical Field

The field generally relates to 3D modeling.

2. Background

Computer graphics applications can render three-dimensional (3D) models representing real world objects. These real world objects can include geographical locations. Some locations can be large with many detailed features, including natural landmarks and man-made structures. 3D models representing such structures can be combined with geo-specific information for use in a geographical information system (GIS), such as Google Earth available from Google Inc.

Figure 1:
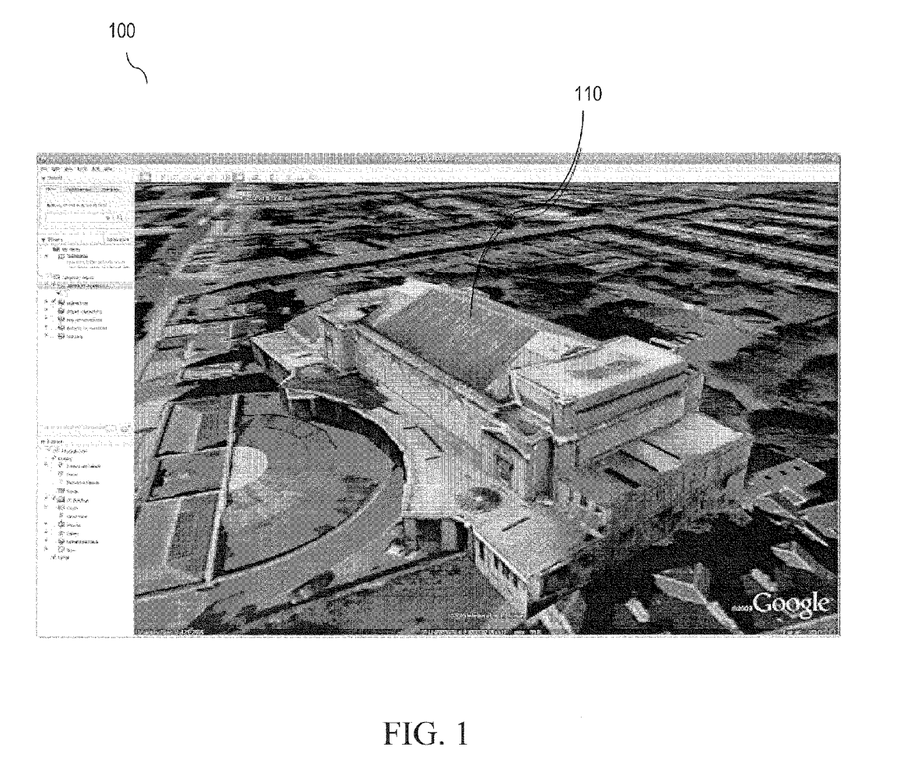
FIG. 1 is an example display view of a textured 3D building model in a GIS.
Figure 2:
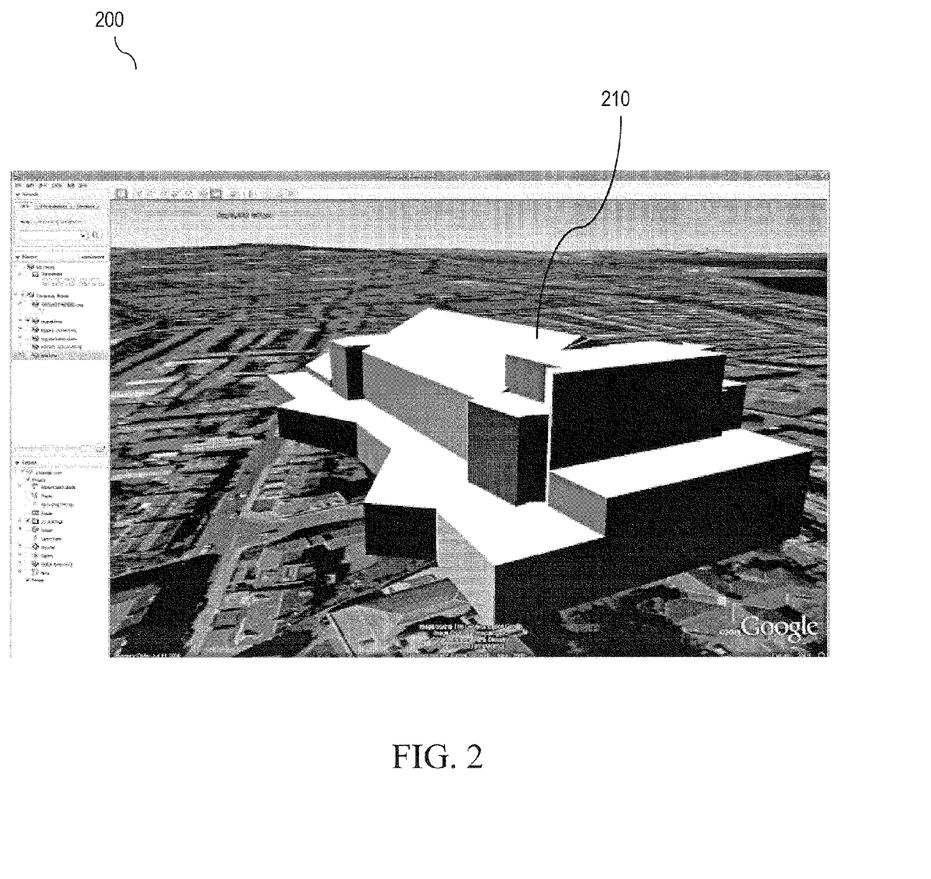
FIG. 2 is an example display view that illustrates a polygonal representation of the 3D building model.

Geo-specific 3D models may also be developed from images showing the structures to be modeled. These images may include oblique images, or images taken with a camera tilted at an angle relative to the surface of the earth or a target structure. For example, aerial pictures of city buildings and landmarks can be taken from different angles above a city such that the sides of the buildings and landmarks are captured. These images may be used to texture the surfaces of 3D building models to give a realistic look to the 3D building models. For example, 3D building model 110 is shown in display view 100 of FIG. 1. FIG. 2 shows an exemplary rendering 3D model 210 of building 110 in display view 200 that illustrates the polygon surfaces that are used to construct the 3D model of the building.

Figure 3:
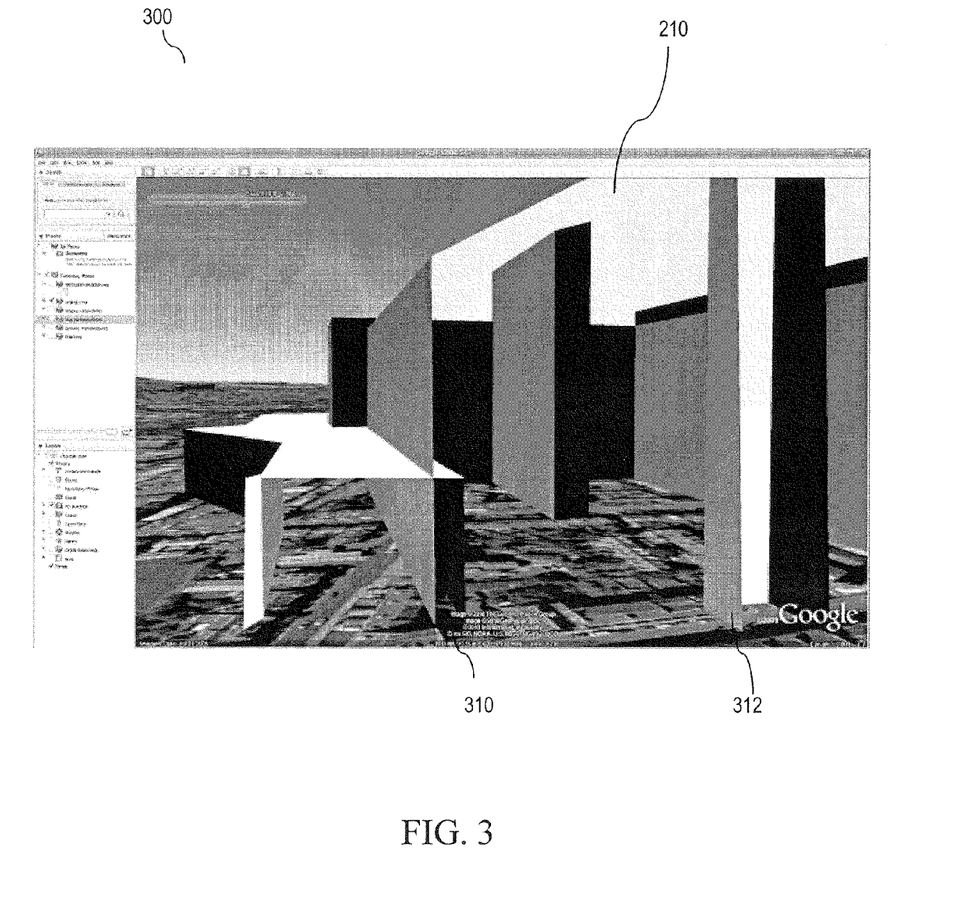
FIG. 3 is an example display view of a cross-section of the 3D building model.

However, systems that develop 3D building models often generate excess polygon surfaces within the 3D building models. These faces are hidden from view and unnecessarily use up memory, processor and network bandwidth resources. For example, FIG. 3 shows hidden faces in 3D building model 210, such as faces 310 and 312 shown in display view 300.

BRIEF SUMMARY

Embodiments described herein refer to systems and methods for removing hidden faces in a 3D building model. While this description makes references to a 3D building model, the term 3D building model may include 3D models of other structures (e.g., bridges and monuments), natural landmarks, man-made objects or any other real world or imagined object.

According to an embodiment, a method for removing hidden faces in a 3D building model may include identifying a 3D building model having hidden surfaces inside the building model. The method may further include adding closing surfaces to the hidden surfaces to form closed hidden surfaces. The method may further include combining the closed hidden surfaces into a single polygon. The method may then include removing the closed hidden surfaces.

According to another embodiment, a system for removing hidden faces in a 3D building model may include a surface identifier configured to identify a 3D building model having hidden surfaces inside the building model. The system may also include a surface adder configured to add closing surfaces to the hidden surfaces to form closed hidden surfaces. The system may further include a surface combiner configured to combine the closed hidden surfaces into a single polygon. The system may also include a surface remover configured to remove the closed hidden surfaces.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

3D building models may be developed using 3D polygons. These models may be generated by several processes which fit geometric primitives or polygonal shapes to source data. Primitives are the simplest solid objects used for the representation, including boxes, cylinders, prisms, pyramids, spheres and cones. The set of allowable primitives is limited by each software package. In an efficient implementation, these 3D building models should only contain the exterior, visible walls of the buildings and should exclude any polygons underneath or inside of the models. A variety of manual and automatic processes may be used to generate 3D building models. However, modeling processes can produce disjointed geometric primitives, such as boxes or extruded horizontal polygons. These disjointed shapes can intersect each other, creating surfaces which are hidden and not visible or useful for the user of the application. FIG. 3 shows an example of hidden faces in 3D building model 210, such as faces 310 and 312 shown in display view 300. Building model 210 is made of multiple box shapes and gabled roof shapes, all with open bottoms. These erroneous faces unnecessarily use up memory, processor and network bandwidth resources.

Figure 4:
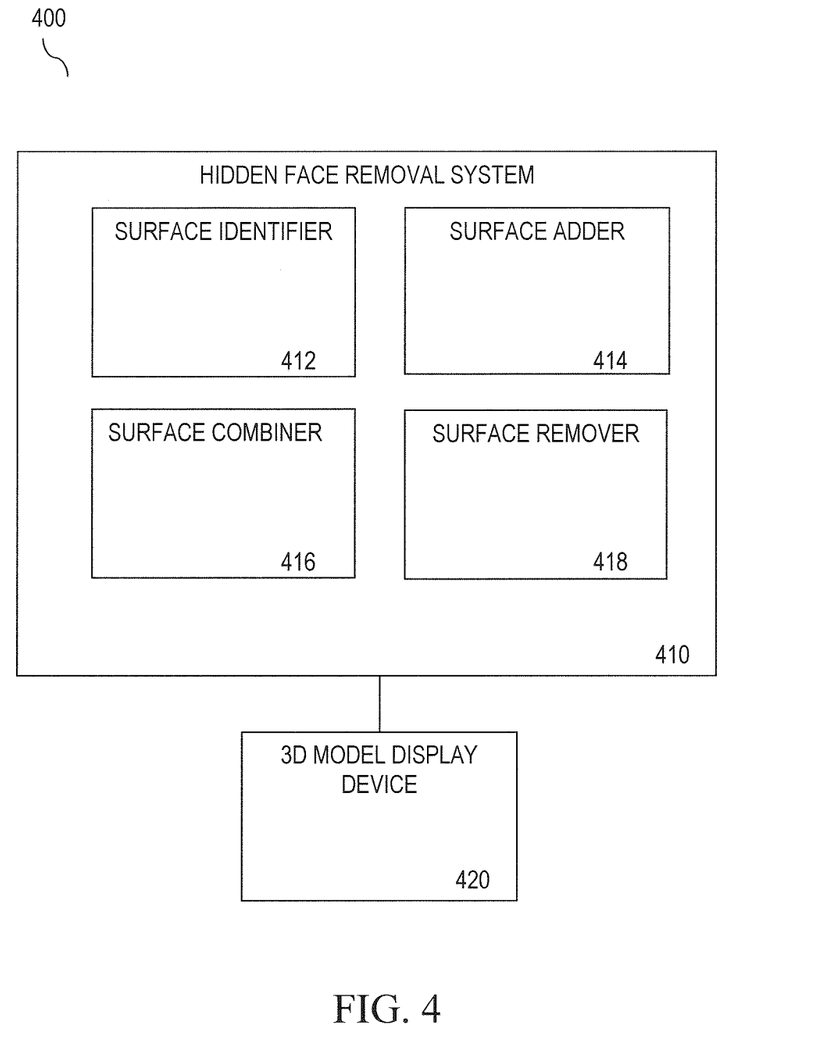
FIG. 4 is a diagram of a system for removing hidden faces in a 3D building model, according to an embodiment.

The embodiments described below remove unnecessary surfaces and create a more efficient 3D representation of a building. FIG. 4 shows exemplary system 400, including hidden face removal system 410 and 3D model display device 420. Hidden face removal system 410 may be software executed on a processor-based computing device. A computing device can be any type of device having one or more processors. For example, a computing device can be a workstation, mobile device (e.g., a mobile phone, personal digital assistant, tablet or laptop), computer, server, compute cluster, server farm, game console, set-top box, kiosk, embedded system or other device having at least one processor and memory. Embodiments of the present invention may be software executed by a processor, firmware, hardware or any combination thereof in a computing device. According to a further embodiment, system 400 may include access to one or more databases, such as an image or model repository.

System 400 may be configured to execute computer graphics software, according to an embodiment. In a further embodiment, hidden face removal system 410 may be configured to be executed by computer graphics software. Such graphics software may include a graphics application for creating 3D building models. In some cases, hidden face removal system 410 may operate through a web-based application such as a web browser. Web-based applications may also include thin client applications that retrieve content from and provide content to hidden face removal system 410 or an application server coupled to hidden face removal system 410. System 400 may display images and 3D building models on 3D model display device 420.

According to an embodiment, hidden face removal system 410 may include surface identifier 412, surface adder 414, surface combiner 416 and surface remover 418. Surface identifier 412 may be configured to identify a 3D building model having hidden surfaces inside the building model. Often buildings or portions of a building may intersect, creating extra internal surfaces. Surface identifier 412 may be configured to identify building model intersections or building models with a likelihood of intersecting.

Surface identifier 412 may also be configured to identify surfaces that are hidden within a 3D building model, such as those shown in FIG. 3. Surface identifier 412 may detect characteristics common to hidden surfaces or perform calculations or comparisons to identify hidden surfaces. This may include detecting loops of surface edges at the bottom of a 3D building model. Hidden surfaces may be tagged or annotated for further processing.

In general, building component shapes are not closed volumes because they may, for instance, lack polygons closing the bottom of the shape. To combine component shapes, surfaces may be added to each shape to make it into a closed volume. Surface adder 414 may be configured to close surfaces by adding closing surfaces to the hidden surfaces to form closed hidden surfaces. Surface adder 414 may also be configured to tessellate the hidden surfaces with the closing surfaces. A tessellation may be considered a tiling of the plane with plane figures that fill the plane with no overlaps and no gaps. Tessellations may be parts of the plane or of other surfaces. A regular tessellation may include regular polygons such as equilateral triangles, squares, or hexagons. According to an embodiment, tesselation may be a technique used to decompose a polygon, typically lying in a plane, into a set of triangles. In some cases, tessellating includes adding triangles in a fan shape. Other types of tessellations may also be used.

Figure 5:
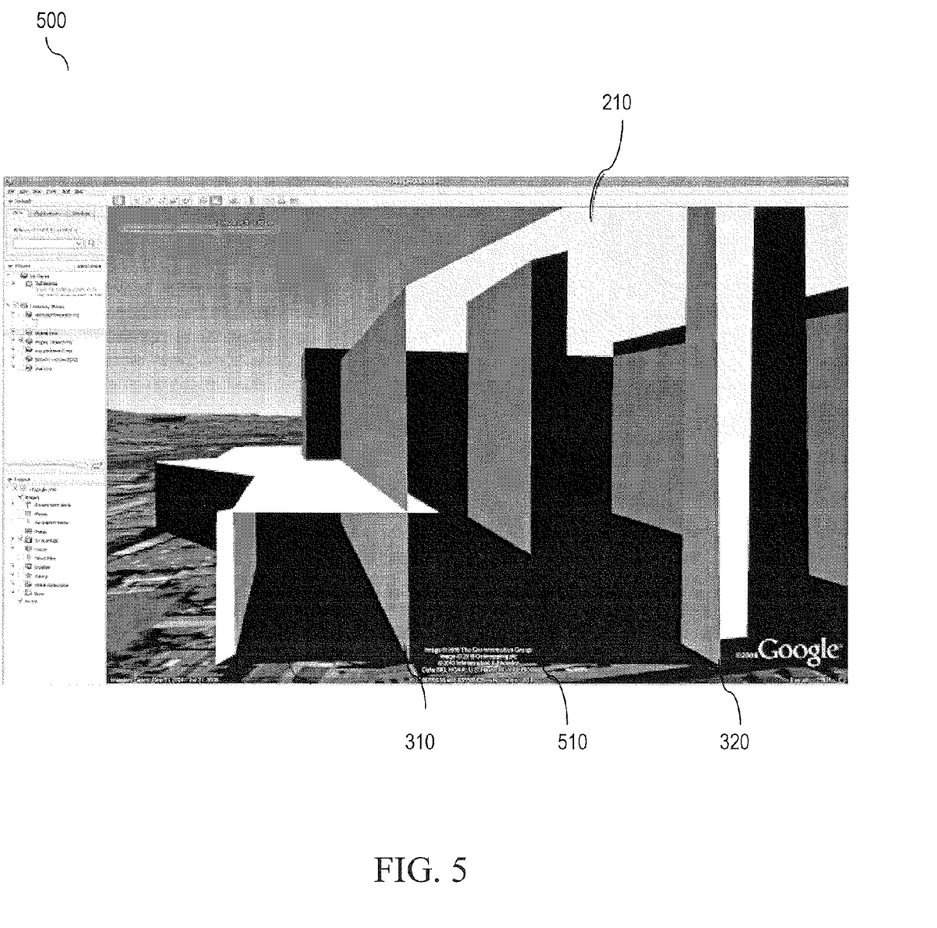
FIG. 5 is an example display view of closing hidden faces of a 3D building model, according to an embodiment.

FIG. 5 shows exemplary display view 500 and tessellation of open surfaces 310 and 320 with added surface(s) 510. As a result, the holes of the open polygons within building model 210 are closed. The closing surface(s) 510 in this example are shown by the dark surface(s) along the internal floor of the building. Surface adder 414 may keep track of the added surfaces for future processing and removal.

Closed volumes may be combined into a single volume. By combining the closed surfaces and volumes into a single volume or polygon, removal of the hidden surfaces may be more effectively accomplished. According to an embodiment, surface combiner 416 may be configured to combine surfaces. For example, closed hidden surfaces may be combined into a single polygon or a single volume. In most embodiments, surfaces may be combined using a Constructive Solid Geometry union. Constructive solid geometry (CSG) may be used in 3D modeling. CSG may use union, intersection and difference operators to combine polygons or solid models. In some cases, surface combiner 416 may be configured to operate on building polygon meshes. According to further embodiments, other methods may be employed to produce a closed volume.

Figure 6:
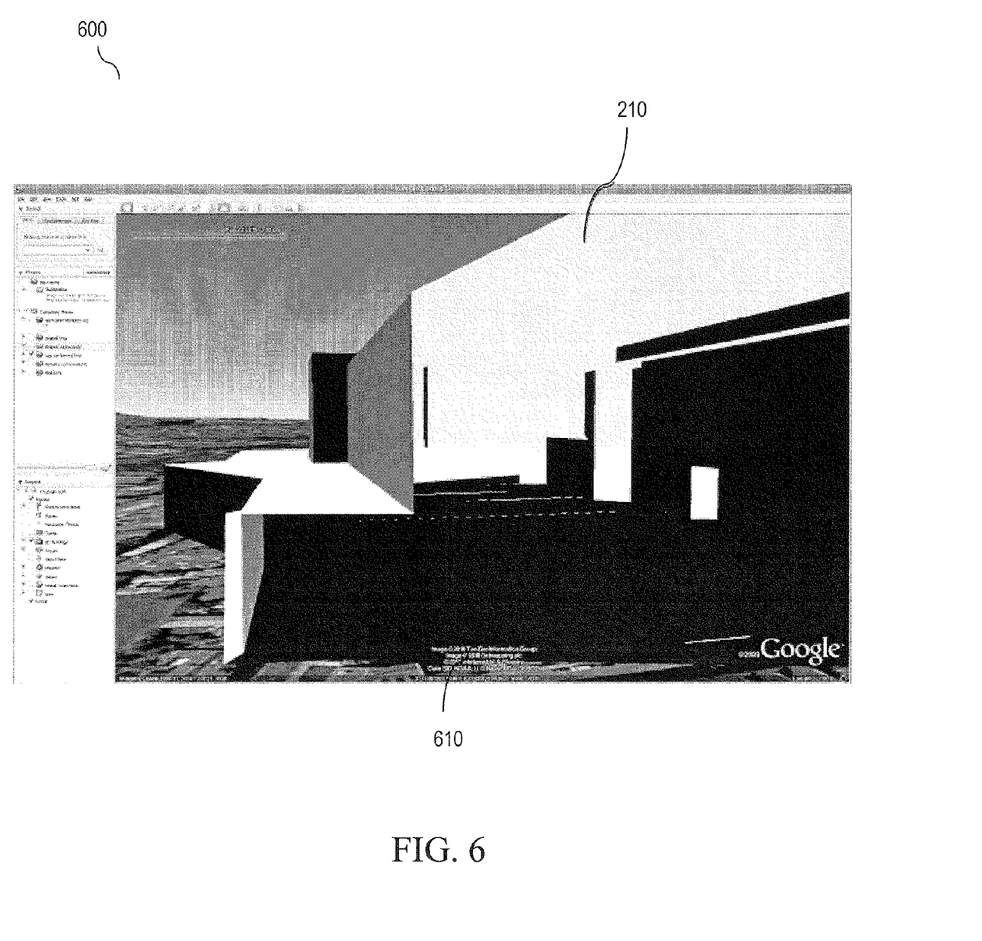
FIG. 6 is an example display view of combining closed faces in a single polygon, according to an embodiment.

FIG. 6 shows an exemplary display view 600. In display view 600, the closing hidden surface 510 can be seen with hidden faces 310 and 320. Once the closed hidden surfaces are combined, only the combined volume 610 may be seen. The hidden surfaces 310 and 320 that are internal to building model 210 are removed and no longer visible in this display view. The bottom of the model will need to be removed.

A building shape or mesh may be turned into an open volume by automatically identifying and removing unnecessary polygons underneath the buildings, leaving only those surfaces which are visible from a street level or aerial view of the building. According to a further embodiment, surface remover 418 may be configured to remove hidden surfaces. Surface remover 418 may be configured to identify and remove unnecessary polygons. This may include removing the closing surfaces that were added to the hidden surfaces.

Figure 7:
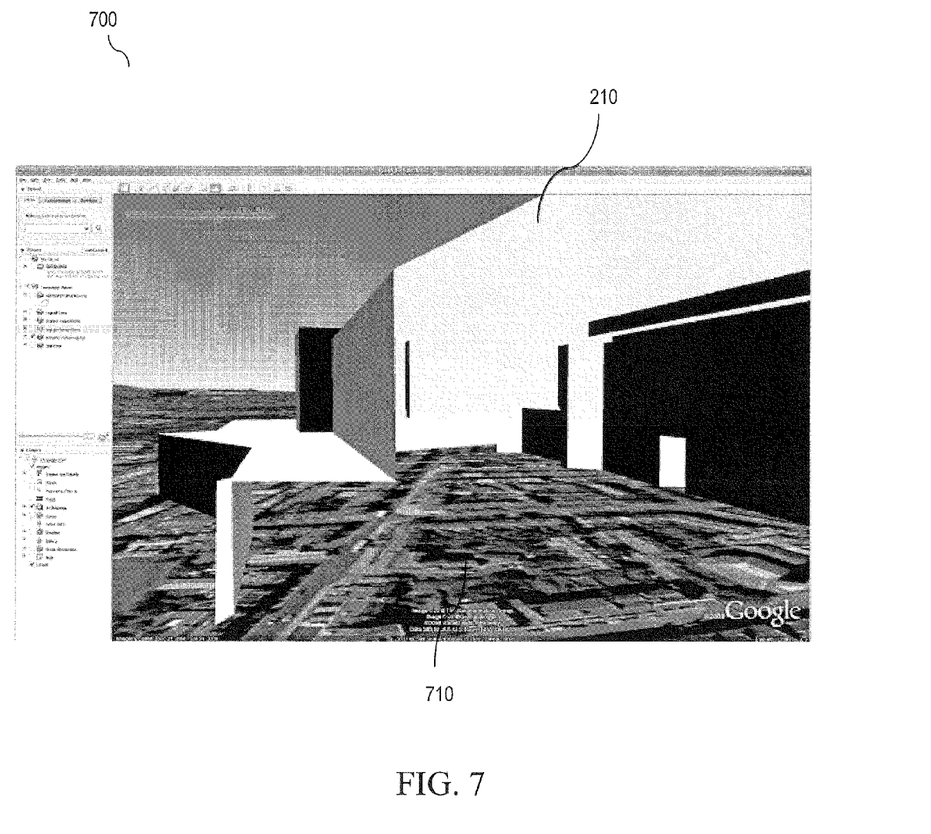
FIG. 7 is an example display view of removed hidden faces in a 3D building model, according to an embodiment.

FIG. 7 shows an exemplary display view of building 210. In this figure the hidden surfaces inside the building have been removed. The flat bottom surfaces have also been removed. The ground surface 710 is visible and only the external visible surfaces remain. In some cases, some artifacts such as colored slivers may remain. These artifacts may be removed. With the hidden surfaces removed, the 3D building model has a smaller and more efficient data footprint.

Figure 8:
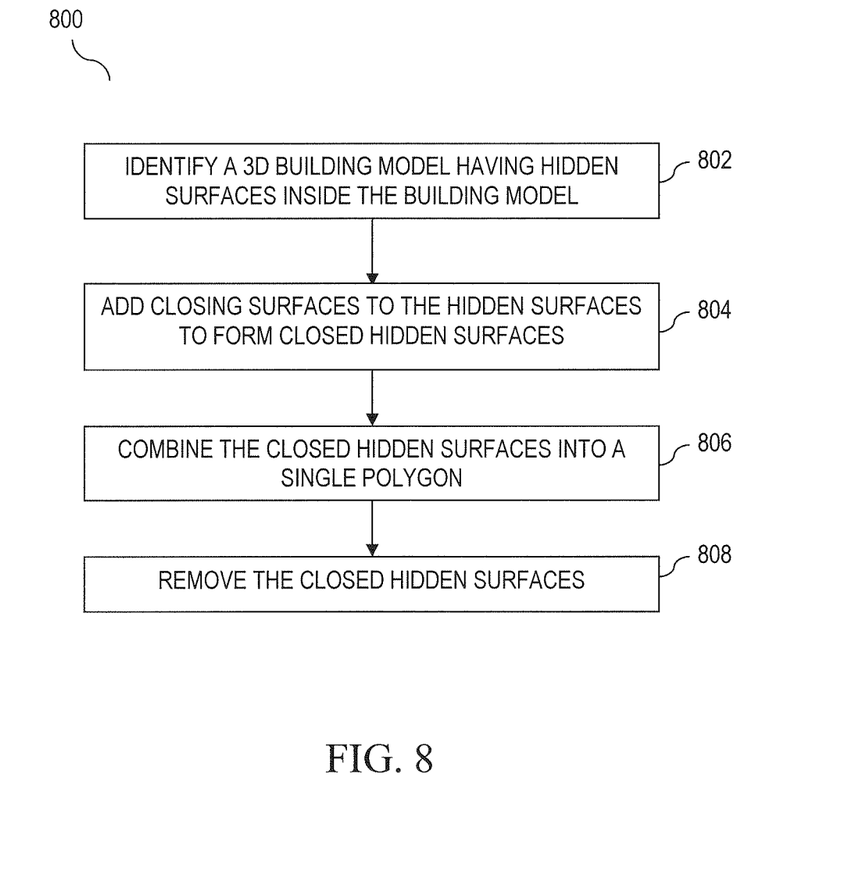
FIG. 8 is a flowchart illustrating a method for removing hidden faces in a 3D building model, according to an embodiment.

FIG. 8 is a flowchart illustrating an exemplary method 800 for removing hidden surfaces of a 3D model, such as a 3D building model. In step 802, a 3D building model having hidden surfaces inside the model may be identified. Identification may include looking for intersecting building models. Identification may also include identifying intersecting polygons of the same building model or hidden faces within a building model.

In step 804, closing surfaces may be added to hidden surfaces to form closed hidden surfaces. This step may include tessellation. For example, planes or triangles may be added to the hidden surfaces. Hidden surfaces may be open and closing surfaces may be added to these open surfaces to form the closed hidden surfaces. Closed hidden surfaces may allow for further polygon and shape operations.

In step 806, the closed hidden surfaces may be combined into a single polygon or volume. This may be performed with a Constructive Solid Geometry (CSG) operation, such as a union. In step 808, the closed hidden surfaces may be removed. This may involve removing the closed hidden surfaces or tessellated portions inside the building model. According to an embodiment, steps 802-808 may be performed with hidden surface removal system 400.

By removing hidden surfaces as described in the embodiments above, unnecessary artifacts and surfaces may be removed. This will provide for more efficient rendering of 3D building models.

Although aspects of the invention can be used to model 3D buildings, embodiments of the invention are not limited to geographical locations or buildings. Aspects of the invention can also be used in areas of manufacturing, engineering design, research, medicine, physics, biology, geology, astronomy, architecture, entertainment, sports, or any other field that involves imaging from various perspectives.

Aspects of the present invention, for exemplary systems 400-700 and/or method 800 or any part(s) or function(s) thereof may be implemented using hardware, software, firmware, tangible computer readable or computer usable storage media having instructions stored thereon, or a combination thereof and may be implemented in one or more computer systems or other processing systems.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for removing hidden faces in a 3D building model, comprising:
    identifying a 3D building model having hidden surfaces, wherein the hidden surfaces are hidden inside the 3D building model;
    adding, with a computing device, closing surfaces to the hidden surfaces to form closed hidden surfaces;
    combining the closed hidden surfaces into a single polygon such that the single polygon is representative of the hidden surfaces and the closing surfaces, wherein the combining facilitates effective removal of the hidden surfaces from the 3D building model; and
    removing the single polygon from the 3D building model such that the hidden surfaces and the closing surfaces are removed from the building model.

2. The method of claim 1, wherein only external surfaces of the building model remain.

3. The method of claim 1, wherein the identifying includes identifying building model intersections.

4. The method of claim 1, wherein the identifying includes detecting loops of surface edges at the bottom of the building model.

5. The method of claim 1, wherein the combining includes performing a constructive solid geometry union.

6. The method of claim 1, wherein the adding includes tessellating the hidden surfaces with the closing surfaces.

7. The method of claim 6, wherein the tessellating includes tessellating triangles in a fan shape.

8. The method of claim 1, wherein the removing includes identifying and removing unnecessary polygons within the building model.

9. A system for removing hidden faces in a 3D building model, comprising:
    a surface identifier, implemented with a computing device having one or more processors, configured to identify a 3D building model having hidden surfaces, wherein the hidden surfaces are hidden inside 3D the building model;
    a surface adder, implemented with a computing device having one or more processors, configured to add closing surfaces to the hidden surfaces to form closed hidden surfaces;
    a surface combiner, implemented with a computing device having one or more processors, configured to combine the closed hidden surfaces into a single polygon such that the single polygon is representative of the hidden surfaces and the closing surfaces, wherein the surface combiner facilitates effective removal of the hidden surfaces from the 3D building model; and
    a surface remover, implemented with a computing device having one or more processors, configured to remove the single polygon from the 3D building model such that the hidden surfaces and the closing surfaces are removed from the 3D building model.

10. The system of claim 9, wherein only external surfaces of the building model remain.

11. The system of claim 9, wherein the surface identifier is further configured to identify building model intersections.

12. The system of claim 9, wherein the surface identifier is further configures to detect loops of surface edges at the bottom of the building model.

13. The system of claim 9, wherein the surface combiner is further configured to perform a constructive solid geometry union.

14. The system of claim 9, wherein the surface adder is further configured to tessellate the hidden surfaces with the closing surfaces.

15. The system of claim 14, wherein the surface adder is further configured to tessellate triangles in a fan shape.

16. The system of claim 9, wherein the surface remover is further configured to identify and remove unnecessary polygons within the building model.

17. The method of claim 1, further comprising:
    identifying the hidden surfaces by finding intersecting polygons of the 3D building model.

18. The method of claim 1, wherein the adding closes at least one hole in a bottom of the 3D building model, and the removing opens the at least one hole in the bottom of the 3D building model.

19. The system of claim 9, wherein the surface identifier is further configured to identify the hidden surfaces by finding intersecting polygons of the 3D building model.

20. The system of claim 9, wherein the surface adder is further configured to add closing surfaces to close at least one hole in a bottom of the 3D building model, and the surface remover removes the single polygon such that the at least one hole is opened in the bottom of the 3D building model.

* * * * *